United States Patent [19]
Thweatt

[11] Patent Number: 5,721,655
[45] Date of Patent: Feb. 24, 1998

[54] METHOD FOR LABELING A REMOVABLE MEDIA CARTRIDGE

[75] Inventor: William O. Thweatt, Allan, Tex.

[73] Assignee: Electronic Data Systems Corporation, Plano, Tex.

[21] Appl. No.: 680,369

[22] Filed: Jul. 15, 1996

[51] Int. Cl.$^6$ .......................... G11B 33/10; G11B 23/38
[52] U.S. Cl. .................... 360/137; 360/132; 369/291
[58] Field of Search ........................ 360/132, 137; 369/291

[56] References Cited

U.S. PATENT DOCUMENTS

| | | | |
|---|---|---|---|
| 3,995,319 | 11/1976 | Harris | 360/132 |
| 4,338,644 | 7/1982 | Staar | 360/132 |
| 4,426,684 | 1/1984 | Sechet et al. | 364/900 |
| 4,593,337 | 6/1986 | Leone et al. | 360/137 |
| 5,023,741 | 6/1991 | Conti et al. | 360/132 |
| 5,034,760 | 7/1991 | Khait | 354/105 |
| 5,105,179 | 4/1992 | Smith | 340/468 |
| 5,148,403 | 9/1992 | Gardner | 360/15 |
| 5,290,066 | 3/1994 | Mody | 281/15.1 |
| 5,351,159 | 9/1994 | Dodt et al. | 360/132 |
| 5,424,626 | 6/1995 | Leonhardt et al. | 235/487 |
| 5,508,984 | 4/1996 | Goto | 369/47 |

*Primary Examiner*—Stuart S. Levy
*Assistant Examiner*—William J. Klimowicz
*Attorney, Agent, or Firm*—L. Joy Griebenow; Anthony E. Peterman

[57] ABSTRACT

A method is provided for labeling a removable media cartridge (10). The removable media cartridge (10) encloses a storage media (13) and has an external label (15). The removable media cartridge (10) is mounted in physical hardware for writing data to the storage media (13). A label number is selected for the removable media cartridge (10). An internal label (14) is then written to the storage media (13) where the internal label (14) represents the selected label number, and data is written to the external label (15) where the data also represents the selected label number.

12 Claims, 1 Drawing Sheet

METHOD FOR LABELING A REMOVABLE MEDIA CARTRIDGE

TECHNICAL FIELD OF THE INVENTION

This invention relates in general to labeling removable media cartridges, and more particularly to a method for labeling a removable media cartridge.

BACKGROUND OF THE INVENTION

Data used in the operation of businesses is often stored on removable media cartridges, such as magnetic tapes, compact disc, and magnetic disk cartridges. These cartridges provide a relatively durable medium for storing and retrieving data. Often, cartridges are warehoused and maintained in libraries such that the data stored on them can be located and accessed when needed. Keeping track of the data stored on and the location of each cartridge in a library can be problematic. Further, as the amount of stored data increases, problems related to maintaining warehouses and libraries for the cartridges increase as well.

One problem is the space required for warehousing libraries of cartridges. Each library can include a large number of cartridges and require relatively large amounts of warehousing space. In addition, blank, or empty, slots are often maintained for cartridges that have been deleted or scratched, have been shipped off-site, or have been loaded in automatic retrieval units. These blank slots result from the fact that it can be difficult to shrink libraries because of the physical effort and expense involved in re-labeling cartridges.

Re-labeling can be costly because cartridges typically have both an external label as well as an internal label written on the storage media, itself. These two labels need to remain in sync so the data stored in the cartridges does not become lost. Consequently, re-labeling requires more than simply reprinting an external label. Further, another problem with maintaining libraries occurs when internal and external labels become out of sync as a result of re-labeling.

Another problem arises from maintaining multiple libraries within a single warehousing space. Often, within multiple libraries, the same label numbers are present in more than one library. For example, two libraries may have labels that begin with the letter "A." If an operator places a cartridge back into the wrong library by mistake, the cartridge can be lost. Also, because of the similar labels, an operator may load, ship or otherwise process the wrong cartridges. This problem can be somewhat alleviated by manually re-labeling cartridges or marking them to ensure that the labels are unique.

A number of conventional methods have been used to address the problems of storage space and labeling. One such method is to compress libraries. Compression involves generating new labels and allocating the resources necessary to replace all the old external labels. A software program can then be used to match the new external labels to the original internal labels. In this manner, blank slots in the library can be removed, thus compressing the library. However, this compression process is manual, is error prone and time consuming, and provides only a temporary solution.

Another method is to use a software program that provides random slotting using bar codes. This method requires each cartridge to have a bar code that is scanned whenever the cartridge is moved to a new slot. The new slot also needs a bar code which is also scanned. Then, the software program can correlate cartridges and slots as well as indicate in what slot a new cartridge should be placed. However, this method can be cumbersome for large libraries and for managing multiple libraries. In addition, the amount of space required for bar code labels on each slot expands the physical space needed for the slots.

SUMMARY OF THE INVENTION

In accordance with the present invention, a method for labeling a removable media cartridge is provided that substantially reduces or eliminates problems associated with previously developed labels and labeling methods for removable media cartridges.

According to one aspect of the present invention, a removable media cartridge is provided that includes a cartridge body enclosing a storage media. The removable media cartridge also includes an external label coupled to the cartridge body. The external label includes a display operable to visually show a label number. The external label also includes a controller coupled to the display. The controller is operable to store data representing the label number and to drive the display responsive to the data. The external label further includes an interface port coupled to the controller. The interface port provides external access to the controller for writing data to the controller.

According to another aspect of the present invention, a method is provided for labeling a removable media cartridge. A removable media cartridge is provided that encloses a storage media and has an external label. The removable media cartridge is mounted in physical hardware for writing data to the storage media. A label number is selected for the removable media cartridge. An internal label is then written to the storage media where the internal label represents the selected label number, and data is written to the external label where the data also represents the selected label number.

A technical advantage of the present invention is the ability to efficiently compress a warehouse of cartridges such that only active tapes occupy slots and such that there are no empty slots due to cartridges that have been designated as delete or scratch cartridges.

Another technical advantage of the present invention is that, when a cartridge is needed, an operator can easily retrieve the correct cartridge because there can be a one-to-one correspondence between label numbers and physical slots in the warehouse (i.e., no duplication of labels or numbers between libraries).

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Figure 1:
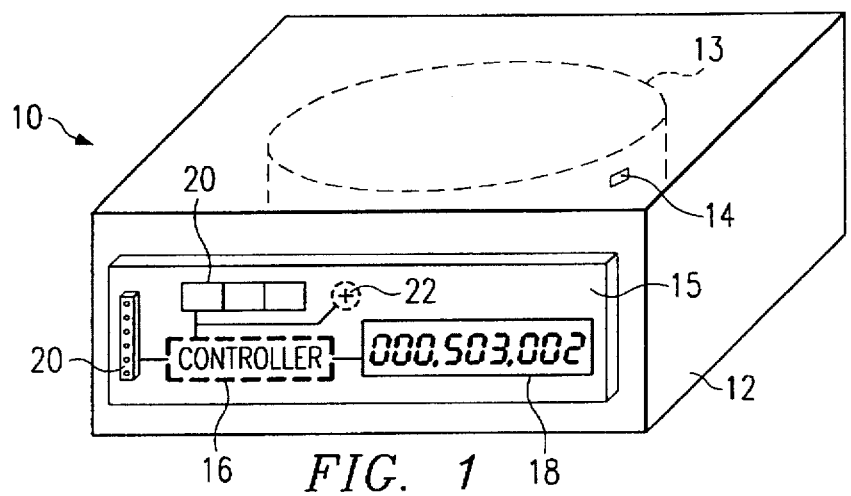
FIG. 1 is a diagram of one embodiment of an external label for a removable media cartridge constructed according to the teachings of the present invention.

FIG. 1 is a diagram of one embodiment of an external label for a removable media cartridge constructed according to the teachings of the present invention. A removable media cartridge, indicated generally at 10, includes a cartridge body 12 which encloses media 13 for storing data. In the illustrated embodiment, media 13 is magnetic tape. Media 13 can also be a compact disc, laser disc, magnetic disk or other data storage medium. As shown, media 13 includes an internal label 14 for cartridge 10. An external label 15 is coupled to cartridge body 12 of cartridge 10. External label 15 can be affixed to cartridge body 12, formed integral with cartridge body 12, or otherwise coupled to cartridge body 12.

External label 15 includes a controller 16. In the illustrated embodiment, controller 16 is enclosed in external label 15. Controller 16 includes memory and control logic and can be an application specific integrated circuit (ASIC) chip, an erasable programmable memory device (EPROM), a programmable micro-controller, or other device having some data storage capability. Controller 16 is connected to and drives a display 18 which provides a visual external label for cartridge 10. Display 18 can be a liquid crystal display (LCD), light emitting diode (LED) display or other type of display device. External label 15 can be sized as appropriate for cartridge body 12 and to provide readability of display 18. In one embodiment, where cartridge 10 is a magnetic tape cartridge, external label 15 is approximately three inches long, one inch wide and ⅛ of an inch thick.

External label 15 also includes an interface port 20 connected to controller 16. Interface port 20 provides external access to controller 16. Interface port 20 can be a serial connection, parallel connection or other connection appropriate for controller 16. A solar cell 20 and a battery 22 are connected to controller 16 and supply power. It should be understood that other sources of power, if needed, can be used, including the designation of a pin in interface port 20 as a power supply pin for receiving power from an external power supply.

In operation, external label 15 provides a programmable label for cartridge 10. Controller 16 can store an appropriate label number for cartridge 10 as well as drive display 18 to visually show the label number. Controller 16 comprises programmable memory and logic for reading the memory and for controlling display 18. One embodiment of controller 16 is shown in and described with respect to FIG. 2.

The programmable nature of external label 15 allows it to be initialized along with media 13 when data is written to media 13. The physical hardware used to write data to media 13 can write internal label 14 as well as attach to interface port 20 and write data to controller 16. This ensures that internal label 14 and external label 15 remain in sync when data is initially created on cartridge 10 and when cartridge 10 is processed as a delete cartridge.

Figure 2:
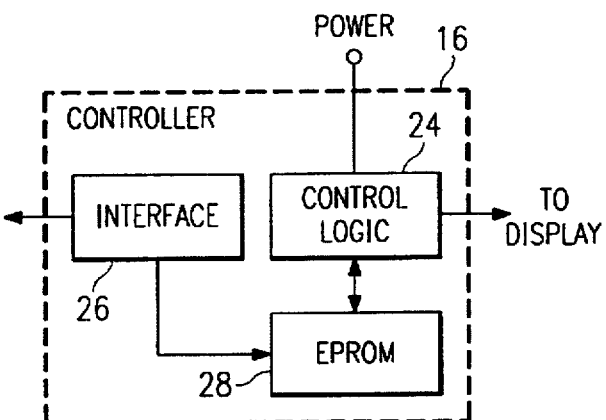
FIG. 2 is a block diagram of one embodiment of a controller for the external label of FIG. 1.

FIG. 2 is a block diagram of one embodiment of controller 16 for external label 15 of FIG. 1. Controller 16 of FIG. 2 includes control logic 24 that is connected to a power supply. The power supply can be solar cell 20 or battery 22 of FIG. 1 or another appropriate power supply. In one embodiment, control logic 24 has an active mode and an inactive mode and can switch to the active mode responsive to power received from the power supply. Control logic 24 is also connected to and drives display 18 of FIG. 1. Controller 16 further includes an interface block 26 that is connected to interface port 20 of FIG. 1. Both interface block 26 and control logic 24 are connected to an erasable-programmable read only memory (EPROM) 28.

In operation, EPROM 28 stores a representation of a label number for cartridge 10. It should be understood that this label number can include digits, letters or other characters as desired. Control logic 24 reads the label number from EPROM 28 and provide signals to drive display 18 to visually show the label number. Control logic 24 can also provide power to EPROM 28 in order to allow data to be read from EPROM 28. Interface 26 provides access to EPROM 28 for external reading from or writing to EPROM 28. Through interface 26, EPROM 28 can be loaded with the appropriate label number when data is written to cartridge 10. That label number is then read by control logic 24 and used to drive display 18.

Where control logic 24 has an active and inactive mode, control logic 24 can be implemented to drive display 18 only when in the active mode. For example, solar cell 20 could be used as the power supply for external label 15. When no light is shining on solar cell 20, control logic 24 would not be receiving power and could respond by going to the inactive mode. When light is shining on solar cell 20, control logic 24 would receive power and could respond by going to the active mode. In the active mode, control logic 24 could read the label number stored in EPROM 28, and drive display 18.

In general, controller 16 provides memory for storing a label number, allows data to be written to the memory, and produces signals to drive display 18 responsive to the data stored in the memory. Therefore, it should be understood that other implementations for controller 16 are possible and that the functions performed by controller 16 can be divided into and performed by separate integrated or discrete devices.

Figure 3:
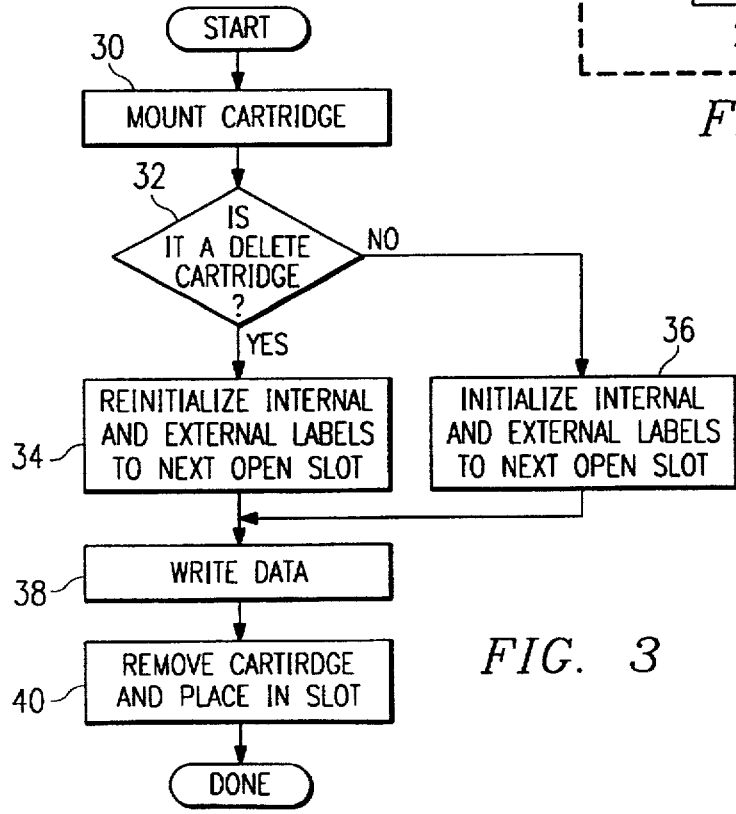
FIG. 3 is a flow chart of a method for labeling removable media cartridges using external labels according to the teachings of the present invention.

FIG. 3 is a flow chart of a method for labeling removable media cartridges using external labels according to the teachings of the present invention. This method can be accomplished using physical hardware designed to write data to the storage media inside the cartridges and to interface with the external label.

In step 30 of FIG. 3, a cartridge is mounted in the physical hardware for writing data to the storage media. In step 32, the cartridge is checked to see whether it is a delete cartridge. If so, in step 34, the cartridge is reinitialized such that the internal and external labels are set to the next available open slot in the warehouse. If the cartridge is not a delete cartridge, then in step 36, the cartridge is initialized such that the internal and external labels are set to the next available open slot in the library. The difference between steps 34 and 36 is that a delete cartridge already has data stored on it and has an internal and external label.

A software program can be used to maintain the status of each slot in the warehouse, to select the next available open slot, and to correlate the slots to label numbers, if the two differ. The slot and the label number can be the same, but do not need to be the same. It should be understood that the next available open slot can be an open slot that has filled slots on one or both sides. For example, if a warehouse has 20 slots and slots 1–4, 6–7 and 9–10 are filled, the next available slots can be slot 5, then slot 8 and then slots 11–20.

In step 38, the data to be stored in the cartridge is written to the storage media. The cartridge, in step 40, is then removed from the physical hardware and is placed in the appropriate slot in the warehouse.

When a cartridge is added to a library in the warehouse, the cartridge is assigned a label number based upon the next available physical slot within the warehouse. According to the present invention, the external label on the cartridge can store and display this new label number. Because the external label can be set at the same time data is written to the cartridge, the internal and external labels automatically remain in sync. With this process, every cartridge that is not holding active data can be placed into delete status. In this manner, the warehouse would not have empty slots due to cartridges designated as scratch or delete cartridges.

The ability to automatically initialize both internal and external labels when a cartridge is written with data allows cartridges in a warehouse to be managed by a common software program even where the cartridges hold data from a number of separate libraries. The physical slots in which cartridges are stored can be numbered sequentially, and the software program can track in which slots a particular library has cartridges.

The present invention can provide benefits to any library or warehouse containing a relatively large number of removable media cartridges. The types of storage media, magnetic tapes, compact discs, magnetic discs, etc., continue to be useful because they are an effective and economical way to store large amounts of data. These types of storage media also provide an effective way to store data for disaster recovery. Therefore, it is of continuing importance to be able to reduce the costs and resources necessary to maintain warehouses for libraries of cartridges.

Although the present invention has been described in detail, it should be understood that various changes, substitutions and alterations can be made thereto without departing from the spirit and scope of the invention as defined by the appended claims.

What is claimed is:

1. A method for labeling a removable media cartridge using electronic physical hardware for writing data to a storage media enclosed in the removable media cartridge and an external label fixed to the cartridge inclusive of a controller operable for storing a label number based on the written data, the method comprising:

providing a removable media cartridge enclosing a storage media and having an external label;

mounting the removable media cartridge in electronic physical hardware for writing data to the storage media;

selecting a label number for the removable media cartridge based upon a number of a next available slot among a plurality of slots of a cartridge storage warehouse for the removable media cartridge;

writing an internal label to the storage media, the internal label representing the selected label number; and while the media cartridge is mounted in the physical hardware for writing data to the storage media, writing data to the external label, the data representing the selected label number and being stored in the label controller.

2. The method of claim 1, wherein writing data to the external label comprises writing data to a controller in the external label.

3. The method of claim 1, wherein writing the internal label and writing data to the external label are accomplished concurrently.

4. The method of claim 1, wherein providing the removable media cartridge comprises providing a removable media cartridge that encloses magnetic tape.

5. The method of claim 1, wherein providing the removable media cartridge comprises providing a removable media cartridge that has an external label formed integral with a cartridge body of the removable media cartridge.

6. The method of claim 1, wherein providing the removable media cartridge comprises providing a removable media cartridge that has an external label formed separate from and affixed to a cartridge body of the removable media cartridge.

7. A method for labeling a removable media cartridge using electronic physical hardware for writing data to a storage media enclosed in the removable media cartridge and an external label fixed to the cartridge inclusive of a controller operable for storing a label number based on the written data, the method comprising:

providing a removable media cartridge enclosing a storage media and having an external label;

mounting the removable media cartridge in electronic physical hardware for writing data to the storage media;

selecting a label number for the removable media cartridge, wherein selecting the label number is accomplished by a software program that maintains a correlation between slots in a warehouse and label numbers;

writing an internal label to the storage media, the internal label representing the selected label number; and while the media cartridge is mounted in the physical hardware for writing data to the storage media, writing data to the external label, the data representing the selected label number and being stored in the label controller.

8. The method of claim 7, wherein writing data to the external label comprises writing data to the controller in the external label.

9. The method of claim 7, wherein writing the internal label and writing data to the external label are accomplished concurrently.

10. The method of claim 7, wherein providing the removable media cartridge comprises providing a removable media cartridge that encloses magnetic tape.

11. The method of claim 7, wherein providing the removable media cartridge comprises providing a removable media cartridge that has an external label formed integral with a cartridge body of the removable media cartridge.

12. The method of claim 7, wherein providing the removable media cartridge comprises providing a removable media cartridge that has an external label formed separate from and affixed to a cartridge body of the removable media cartridge.

* * * * *